United States Patent [19]

Kuehl et al.

[11] Patent Number: 4,954,243

[45] Date of Patent: Sep. 4, 1990

[54] CATALYTIC CRACKING WITH FRAMEWORK ALUMINUM EXTRACTED ZEOLITE

[75] Inventors: Guenter H. Kuehl, Cherry Hill; Edward J. Rosinski, Pedricktown, both of N.J.

[73] Assignee: Mobil Oil Corporation, New York, N.Y.

[21] Appl. No.: 456,037

[22] Filed: Dec. 22, 1989

Related U.S. Application Data

[63] Continuation of Ser. No. 313,370, Feb. 21, 1989, abandoned, which is a continuation of Ser. No. 218,412, Jul. 11, 1988, abandoned, which is a continuation of Ser. No. 548,590, Nov. 3, 1983, abandoned.

[51] Int. Cl.$^5$ .............................................. C10G 11/02
[52] U.S. Cl. ...................................... 208/120; 502/77; 585/653
[58] Field of Search .................... 208/120; 502/71, 77; 585/653, 739, 752, 467, 475

[56] References Cited

U.S. PATENT DOCUMENTS

| | | | |
|---|---|---|---|
| 3,442,795 | 5/1969 | Kerr et al. | 208/120 |
| 3,937,791 | 2/1976 | Garwood et al. | 423/328 |
| 4,273,753 | 6/1981 | Chang | 423/328 |
| 4,309,279 | 1/1982 | Chester et al. | 208/120 |
| 4,309,280 | 1/1982 | Rosinski et al. | 208/120 |
| 4,340,465 | 7/1982 | Miller et al. | 208/120 |
| 4,418,235 | 11/1983 | Haag et al. | 585/407 |

FOREIGN PATENT DOCUMENTS

| | | |
|---|---|---|
| 0062123 | 10/1982 | European Pat. Off. . |
| 0095304 | 5/1983 | European Pat. Off. . |
| 0095846 | 12/1983 | European Pat. Off. . |
| 1151653 | 5/1969 | United Kingdom ................ 423/113 |
| 1261616 | 1/1972 | United Kingdom ................ 423/328 |

OTHER PUBLICATIONS

"Chemistry of Crystalline Aluminosilicates", G. T. Kerr, The Journal of Physical Chemistry, vol. 72, 1968, pp. 2594–2596.

Primary Examiner—Patrick P. Garvin
Assistant Examiner—George R. Fourson
Attorney, Agent, or Firm—Alexander J. McKillop; Charles J. Speciale; Marina V. Schneller

[57] ABSTRACT

A zeolite, its method of preparation and use is disclosed. The zeolite is characterized by a silica to alumina mole ratio greater than 12 and a Constraint Index of 1 to 12. The zeolite undergoes controlled alumina extraction by treatment with, e.g., strong mineral acid or chelating agent. Removal of aluminum increases the acid activity of the zeolite.

11 Claims, No Drawings

CATALYTIC CRACKING WITH FRAMEWORK ALUMINUM EXTRACTED ZEOLITE

This is a continuation of copending application Ser. No. 313,370, filed on Feb. 21, 1989, now abandoned, which is a continuation of application Ser. No. 218,412, filed 7-11-88 now abandoned which is a continuation of application Ser. No. 548,590filed 11-2-88, now abandoned.

BACKGROUND OF THE INVENTION

1. Field of the Invention

This invention relates to a catalyst with enhanced acid catalytic activity suitable for use in catalytic processes catalyzed by acid catalysts, the method of preparation of the catalyst, and the catalytic cracking process using the catalyst.

2. Description of the Prior Art

Hydrocarbon conversion processes utilizing crystalline zeolites have been the subject of extensive investigation during recent years, as is obvious from both the patent and scientific literature. Crystalline zeolites have been found to be particularly effective for a wide variety of hydrocarbon conversion processes including the catalytic cracking of a gas oil to produce motor fuels and have been described and claimed in many patents, including U.S. Pat. Nos. 3,140,249; 3,140,251; 3,140,252; 3,140,253; and 3,271,418. It is also known in the prior art to incorporate the crystalline zeolite into a matrix for catalytic cracking and such disclosure appears in one or more of the above-identified U.S. patents.

It is also known that improved results will be obtained with regard to the catalytic cracking of gas oils if a crystalline zeolite having a pore size of less than 7 Angstrom units is included with a crystalline zeolite having a pore size greater than 8 Angstrom units, either with or without a matrix. A disclosure of this type is found in U.S. Pat. No. 3,769,202.

Improved results in catalytic cracking with respect to both octane number and overall yield were achieved in U.S. Pat. No. 3,758,403. In said patent, the cracking catalyst was comprised of a large pore size crystalline zeolite (pore size greater than 7 Angstrom units) in admixture with ZSM-5 zeolite wherein the ratio of ZSM-5 type zeolite to large pore size crystalline zeolite was in the range of 1:10 to 3:1.

The use of ZSM-5 zeolite in conjunction with a zeolite cracking catalyst of the X or Y faujasite variety is described in U.S. Pat. Nos. 3,894,931; 3,894,933; and 3,894,934. The two former patents disclose the use of ZSM-5 zeolite in amounts up to and about 5 to 10 weight percent; the latter patent discloses the weight ratio of ZSM-5 zeolite to large pore size crystalline zeolite in the range of 1:10 to 3:1.

The addition of very small amounts of pure, finely divided shape selective catalyst to a conventional FCC catalyst, was taught in U.S. Pat. No. 4,309,280, the entire contents of which are incorporated herein by reference. This patent taught the advantage of using, as the powdered additive catalyst, a ZSM-5 zeolite with very high silica-alumina ratios. Use of a 1500 to 1 $SiO_2/Al_2O_3$ mole ratio ZSM-5 catalyst in conjunction with a fluid cracking process was disclosed in Example 8 and Example 13. Use of a ZSM-5 material with an even higher ratio was disclosed in Example 9, which added a ZSM-5 material containing only 15 ppm $Al_2O_3$. The patentees commented that the preferred additives, shape selective zeolites such as ZSM-5, were very active even with high silica to alumina mole ratios. This activity was considered surprising, since catalytic activity of zeolites is generally attributed to cations associated with framework aluminum atoms.

U.S. Pat. No. 4,309,279, the entire contents of which are incorporated herein by reference, disclosed the addition of very small amounts of a special class of zeolites characterized by a silica to alumina mole ratio greater than 12 and a constraint index of about 1 to 12, to conventional cracking catalyst. The patentees included a teaching, but no examples, to addition of shape selective zeolites, e.g., ZSM-5, with very high silica to alumina mole ratios, up to 30,000 and greater.

In U.S. Pat. No. 4,340,465, the entire contents of which are incorporated herein by reference, the patentees taught use of ZSM-5 catalyst with very high silica to alumina mole ratios for catalytic cracking. The examples in this patent show that as the silica to alumina mole ratio increased, the activity of the catalyst, as measured by the weight percent conversion, decreased. In going from a sieve containing 2.3 weight percent Al, to 0.45 to 0.04 wt. %, the weight percent conversion declined from 34 to 12 to 7, respectively. This indicated a significant loss in cracking activity when using ZSM-5 with a relatively low aluminum content.

Some work has been done on removal of alumina from relatively large pore zeolites such as mordenite. In U.K. patent specification No. 1,151,653, the patentees disclosed that the hydrogen form of a zeolite was preferred for many hydrocarbon conversion processes, and taught a combination treatment of the zeolite with acid and an ammonium compound to achieve the desired hydrogen form. The treatment included boiling with acid, which would extract some aluminum.

U.K. patent specification No. 1,261,616 taught a method of making acid extracted mordenite.

Some work has also been reported on preparation of aluminum deficient faujasites in "Chemistry of Crystalline Aluminosilicates", G. T. Kerr, the Journal of Physical Chemistry, Vol. 72, 1968, pages 2594–2596 and in U.S. Pat. No. 3,442,795. The entire contents of this reference are incorporated herein by reference. Aluminum was removed directly from sodium zeolite Y, using ethylenediaminetetraacetic acid, EDTA. This reference taught that as most of the Al was removed from the NaY the crystallinity of the material changed, and indeed was lost when less than 20 percent of the original aluminum framework content remained. This reference reported increased sorptive capacity, based on the number of grams of $SiO_2$ in the samples, up to about 70 percent aluminum removal, after which sorptive capacity decreased.

We discovered that it was possible to increase the acid activity, or cracking activity, of intermediate pore size zeolites by extracting aluminum from the framework of certain shape selective zeolites.

BRIEF SUMMARY OF THE INVENTION

Accordingly the present invention provides a process for the enhancement of the catalytic activity of a zeolite having framework aluminum, a Constraint Index of about 1 to 12, a silica to alumina mole ratio greater than about 12 comprising contacting said zeolite with an aluminum extracting reagent at a temperature of 50° to 300° C., at pressure sufficient to maintain a liquid phase, for a time sufficient to remove at least a portion of said zeolite's framework aluminum.

In another embodiment the present invention provides an aluminum deficient zeolite having framework aluminum, a Constraint Index of about 1 to 12 and a silica to alumina mole ratio greater than about 12 characterized by its method of preparation, which comprises contacting said zeolite with an aluminum extracting reagent at a temperature of 50° to 300° C., at a pressure sufficient to maintain a liquid phase, for a time sufficient to remove at least a portion of said framework aluminum.

In yet another embodiment the present invention provides a process for hydrocarbon conversion of a hydrocarbon charge stock comprising the steps of contacting said charge stock in a rection zone under hydrocarbon conversion conditions in the presence of a hydrocarbon conversion catalyst comprising a zeolite having framework aluminum, a Constraint Index of about 1 to 12 and a silica:alumina mole ratio greater than about 12 prepared by extracting at least a portion of said alumina from said zeolite to increase the acid activity of said zeolite prior to use of said zeolite as a hydrocarbon conversion catalyst.

DESCRIPTION OF THE PREFERRED EMBODIMENTS

ZEOLITE STARTING MATERIALS

The members of the class of zeolites of the catalyst of this invention are characterized by a pore dimension greater than about 5 Angstroms, i.e., it is capable of sorbing paraffins having a single methyl branch as well as normal paraffins, and it has a silica to alumina mole ratio of at least 12. Zeolite A, for example, with a silica to alumina ratio of 2.0, is not useful in this invention, and moreover it has no pore dimension greater than about 5 Angstroms.

The members of this class of zeolites constitute an unusual class of natural and synthetic minerals. They are characterized by having a rigid crystalline framework structure composed of an assembly of silicon and aluminum atoms, each surrounded by a tetrahedron of shared oxygen atoms, and a precisely defined pore structure. Exchangeable cations are present in the pores.

These zeolites exhibit some unusual properties. These zeolites induce profound transformations of aliphatic hydrocarbons to aromatic hydrocarbons in commercially desirable yields and are generally highly effective in alkylation, isomerization, disproportionation and other reactions involving aromatic hydrocarbons. Although they have unusually low alumina contents, i.e., high silica to alumina mole ratios, they are very active even with silica to alumina mole ratios exceeding 30. This activity is surprising, since catalytic activity of zeolites is generally attributed to framework aluminum atoms and cations associated with these aluminum atoms. These zeolites retain their crystallinity for long periods in spite of the presence of steam even at high temperatures which induce irreversible collapse of the crystal framework of other zeolites, e.g. of the X and A type. Furthermore, carbonaceous deposits, when formed, may be removed by burning at higher than usual temperatures to restore activity. In many environments, the zeolites of this class exhibit very low coke forming capability, conductive to very long times on stream between burning regenerations.

An important characteristic of the crystal structure of this class of zeolites is that it provides constrained access to, and egress from, the intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline zeolite, the oxygen atoms themselves being bonded to the silicon or aluminum atoms at the centers of the tetrahedra. Briefly, the preferred zeolites useful as starting materials in this invention possess, in combination: a Constraint Index, as hereinafter defined, of about 1 to 12, a silica to alumina mole ratio of at least about 12:1, and a structure providing constrained access to the intracrystalline free space.

The silica to alumina mole ratio referred to may be determined by conventional analysis. This ratio is meant to represent, as closely as possible, the ratio in the rigid anionic framework of the zeolite crystal and to exclude aluminum in the binder or in cationic or other form within the channels. In some zeolites, the upper limit of silica to alumina mole ratio is unbounded, with values of 30,000 and greater. Alumina content correlates with acid activity. Such zeolites, after activation, acquire an intracrystalline sorption capacity for normal hexane which is greater than that for water, i.e., they exhibit "hydrophobic" properties. This hydrophobic character may be advantageous in the present invention.

The zeolites used as starting materials in this invention freely sorb normal hexane and have a pore dimension greater than about 5 Angstroms. In addition, their structure must provide constrained access to some larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is substantially excluded and the zeolite is not of the desired type. Zeolites with windows of 10-member rings are preferred, although excessive puckering or pore blockage may render these zeolites substantially ineffective. Zeolites with windows of 12-membered rings do not generally appear to offer sufficient constraint to produce the advantageous conversions desired in the instant invention, although structures can be conceived, due to pore blockage or other cause, that may be operative. These 12-member rings may be useful in cracking of, e.g., heavy crude fractions which contain some very large molecules which cannot enter the 12-membered ring. This may result in decreased coke make, possible leading to a longer catalyst life. These 12-member rings may also be useful in other reactions than cracking.

Rather than attempt to judge from crystal structure whether or not a zeolite possesses the necessary constrained access, a simple determination of the "Constraint Index" may be made by continuously passing a mixture of equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 538° C. for at least 15 minutes. The zeolite is then flushed with helium and the temperature adjusted between about 288° and 518° C. to give an overall conversion between 10% and 60%. The mixture of hydrocarbons is passed at 1 liquid hourly space velocity (i.e., 1 volume of liquid hydrocarbon per volume of catalyst per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "Constraint Index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Zeolites suitable for the present invention are those which employ a zeolite having a constraint index from 1.0 to 12.0. Constraint Index (C.I.) values for some typical zeolites, including some not within the scope of this invention, are:

| Zeolite | C.I. |
|---|---|
| Erionite | 38 |
| Ferrierite | |
| ZSM-5 | 8.3 |
| ZSM-11 | 8.7 |
| ZSM-35 | 6.0 |
| TMA Offretite | 3.7 |
| ZSM-48 | 3.4 |
| ZSM-38 | 2.0 |
| ZSM-12 | 2 |
| ZSM-4 | 0.5 |
| Acid Mordenite | 0.5 |
| REY | 0.4 |
| Amorphous Silica-Alumina | 0.6 |
| ZSM-23 | 9.1 |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby have different constraint indexes. Constraint Index seems to vary somewhat with severity of operation (conversion). Therefore, it will be appreciated that it may be possible to so select test conditions to establish multiple constraint indexes for a particular given zeolite which may be both inside and outside the above-defined range of 1 to 12.

Thus, it should be understood that the parameter and property "Constraint Index" as such value is used herein is an inclusive rather than an exclusive value. That is, a zeolite when tested by any combination of conditions within the testing definition set forth hereinabove to have a constraint index of 1 to 12 is intended to be included in the instant catalyst definition regardless that the same identical zeolite tested under other defined conditions may give a constraint index value outside of 1 to 12.

The porotectosilicates utilized as promoters herein constitute an unusual class of natural and synthetic materials. They are characterized by having a rigid crystalline framework structure composed generally of an assembly of atoms other than those of oxygen, each surrounded by a tetrahedron of shared oxygen atoms, and a precisely defined pore structure. Two of the crystalline porous tectosilicates which may be used are ZSM-5 and ZSM-11, which have in common some characteristic X-ray diffraction pattern lines. Four strong lines common to ZSM-5 and ZSM-11 are set forth in Table 1 below:

TABLE 1

| Interplanar Spacing d (A) |
|---|
| 11.1 ± 0.3 |
| 10.0 ± 0.2 |
| 3.85 ± 0.07 |
| 3.71 ± 0.5 |

These values were determined by standard techniques. The radiation was the K-alpha doublet of copper, and a scintillation counter spectrometer with a strip chart pen recorder was used. The peak heights, I, and the positions as a function of 2 times theta, where theta as the Bragg angle were read from the spectrometer chart. From these, the relative intensities, 100 I/Io where Io is the intensity of the strongest line or peak and d(obs.), the interplanar spacing in A, corresponding to the recorded lines, were calculated. The interplanar spacing may vary somewhat depending on silica alumina ratio and the presence of other cations.

The members of the class of zeolites defined herein of the catalyst are exemplified by ZSM-5, ZSM-11, ZSM-12, ZSM-23, ZSM-35, ZSM-38 and other similar materials. U.S. Pat. No. 3,702,886 describing and claiming ZSM-5 is incorporated herein by reference. Also, Re. No. 29,948 describing and claiming a crystalline material with an X-ray diffraction pattern of ZSM-5, is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

ZSM-48 is described in U.S. Pat. No. 4,377,497, the entire contents of which, and particularly the X-ray diffraction pattern of said ZSM-48, are incorporated herein by reference.

Natural zeolites may sometimes be converted to this class of zeolites by various activation procedures and other treatments such as base exchange, steaming, alumina extraction and calcination, alone or in combinations. Natural minerals which may be so treated include ferrierite, brewsterite, stilbite, dachiardite, epistilbite, heulandite and clinoptilolite. The preferred zeolites of the catalyst are ZSM-5, ZSM-11, ZSM-12, ZSM-23, ZSM-35 and ZSM-38, with ZSM-5 and ZSM-11 particularly preferred.

The zeolites used in this invention may be in the hydrogen form or they may be ion exchanged or impregnated to contain a rare earth cation complement. Such rare earth cations comprise Sm, Nd, Pr, Ce and La. The zeolite may also contain other cations such as $Al^{3+}$, $Ca^{++}$, $Mg^{++}$, $Zn^{++}$. It is desirable to calcine the zeolite after ion exchange.

In a preferred aspect of this invention, the zeolites comprising the catalysts herein are selected as those having a crystal framework density, in the dry hydrogen form, of not substantially below about 1.6 grams per cubic centimeter. It has been found that zeolites which satisfy all three of these criteria are most desired. Therefore, the preferred catalysts of this invention are those comprising a zeolite having a constraint index as defined above of about 1 to 12, a silica to alumina mole ratio of at least about 12 and a dried crystal density of not substantially less than about 1.6 grams per cubic centimeter. The dry density for known structures may be calculated from the number of silicon plus aluminum atoms per 1000 cubic Angstroms, as given, e.g., on page 19 of the article on *Zeolite Structure* by W. M. Meier. This paper is included in *Proceedings of the Conference on Molecular Sieves, London, Apr.* 1967, published by the Society of Chemical Industry, London, 1968. When the crystal structure is unknown, the crystal framework density may be determined by classical pycnometer techniques. For example, it may be determined by immersing the dry hydrogen form of the zeolite in an organic solvent which is not sorbed by the crystal. It is possible that the unusual sustained activity and stability of this class of zeolites are associated with its high crystal anionic framework density of not less than about 1.6 grams per cubic centimeter. This high density, of course, must be associated with a relatively small amount of free space within the crystal, which might be expected to result in more stable structures. This free space, however, seems to be important as the locus of catalytic activity.

Crystal framework densities of some typical zeolites, including some which are not within the purview of this invention, are:

| Zeolite | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

The catalysts of this invention may be in a matrix, used alone or mixed with other conventional catalysts. The particle size of the individual component particles may be quite small, for example from about 20 to about 150 microns, when intended for use in fluid bed operation, or they may be as large as up to about 1 cm for fixed bed operation. Or the components may be mixed as powders and formed into pellets or extrudate, each pellet containing both components in substantially the required proportions.

As indicated above, the zeolites prepared by the instant invention are formed in a wide variety of particular sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the zeolite can be extruded before drying or dried or partially dried and then extruded.

MATRIX/CLAY BINDER

In the case of many catalysts it is desired to incorporate the new zeolite with another material resistant to the temperatures and other conditions employed in organic conversion processes. Such materials include active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the new zeolite, i.e. combined therewith, which is active, tends to improve the conversion and/or selectively of the catalyst in certain organic conversion processes. Inactive materials suitably serve as diluents to control the amount of conversion in a given process so that products can be obtained economically and orderly without employing other means for controlling the rate of reaction. These materials have been incorporated into naturally-occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally-occurring clays which can be composited with the new zeolite include the montmorillonite and kaolin family, which families include the subbentonites, and the kaolins commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the new zeolite also include inorganic oxides, notably alumina.

In addition to the foregoing materials, the zeolite can be composited with a porous matrix material such as silica-alumina, silica-magnesia, silica-zirconia, silica-thoria, silica-beryllia, silica-titania as well as ternary compositions such as alumina-thoria, silica-alumina-zirconia, silica-alumina-magnesia and silica-magnesia-zirconia. The relative proportions of finely divided crystalline zeolite and inorganic oxide gel matrix vary widely with the total zeolite content ranging from about 1 to about 90 percent by weight and more usually, particularly when the composite is prepared in the form of beads, in the range of about 2 to about 80 percent by weight of the composite.

Hydrocarbon Conversion Processes

The zeolites of the present invention may be used in many hydrocarbon conversion processes, though not all zeolites of this invention will be equally beneficial in all processes.

Employing a catalytically active form of the composition of this invention containing a hydrogenation component, heavy petroleum residual stocks, cycle stocks, and other hydrocrackable charge stocks can be hydrocracked at temperatures between about 200° to 450° C. using molar ratios of hydrogen to hydrocarbon charge in the range between 2 and 80. The pressure employed will vary between 1 to 200 atmospheres, absolute, atm. abs., and the liquid hourly space velocity between 0.1 and 10.

A catalytically active form of the composition of this invention can be employed for catalytic cracking, hydrocarbon cracking stocks can be cracked at a liquid hourly space velocity between about 0.5 and 50, a temperature between about 275° C. to 600° C., a pressure between about subatmospheric and several hundred atmospheres.

Employing a catalytically active form of a member of the family of zeolites of this invention containing a hydrogenation component, reforming stocks can be reformed employing a temperature between about 350° to 55° C. The pressure can be between about 5 to 100 atm., abs., but is preferably between 15 to 50 atm., abs. The liquid hourly space velocity is generally between 0.1 and 10, preferably between 0.4 and 4 and the hydrogen to hydrocarbon mole ratio is generally between 1 and 20 preferably between 4 and 12.

A catalytically active form of the composition of this invention can also be used for hydroisomerization of normal paraffins, when provided with a hydrogenation component, e.g., platinum. Hydroisomerization is carried out at a temperature between about 0° to 400° C., preferably about 150° C. to 300° C., with a liquid hourly space velocity between 0.01 and 2, preferably between 0.25 and 0.50 employing hydrogen such that the hydrogen to hydrocarbon mole ratio is between 1:1 and 5:1. Additionally, the catalyst can be used for olefin isomerization employing temperatures between about 0° to 400° C.

Some zeolites used in the present invention, e.g., ZSM-12, do not increase, unexpectedly, octane number when used in shape selective cracking, but this zeolite is useful for alkylation of benzene with propylene.

Other reactions which can be accomplished employing a catalytically active form of the composition of this invention with or without a metal, e.g., platinum, include hydrogenation-dehydrogenation reactions and desulfurization reactions, olefin polymerization (oligomerization), aromatics alkylation, aromatics isomerization, disproportionation, transalkylation, and other organic compound conversion such as the conversion of alcohols (e.g. methanol to hydrocarbon).

DETAILED DISCUSSION OF CRACKING

As mentioned above, the zeolites produced in accordance with the present invention are especially useful in cracking. The catalytic cracking process can be either fixed bed, moving bed or fluidized bed and the hydrocarbon charge stock flow may be either concurrent or countercurrent to the conventional catalyst flow. The process of this invention is particularly applicable to the fluid catalytic cracking (FCC) process.

Fluidized catalytic cracking is especially benefited by the use of the zeolites, preferably ZSM-5, of the present invention. When used in an FCC operation, the zeolites are preferably in a matrix such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of clay in combination with silica or any of the above specified cogels to form a matrix is highly preferred.

The zeolites of the present invention may beneficially be mixed with conventional cracking catalysts. Conventional cracking catalysts contain active components which may be zeolitic or non-zeolitic. The non-zeolitic active components are generally amorphous silica-alumina and crystalline silica-alumina. However, the major conventional cracking catalysts presently in use generally comprise a crystalline zeolite (active component) in a suitable matrix. Representative crystalline zeolite active component constituents of conventional cracking catalysts include zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), synthetic mordenite and dealuminized synthetic mordenite, merely to name a few, as well as naturally occuring zeolites, including chabazite, faujasite, mordenite, and the like. Preferred crystalline zeolites include the synthetic faujasite zeolites X and Y, with particular preference being accorded zeolite Y.

The crystalline zeolite employed as a constituent in the cracking catalyst compositions of the present invention is essentially characterized by a high catalytic activity.

In general, the crystalline zeolites are ordinarily ion exchanged either separately or in the final catalyst with a desired cation to replace alkali metal present in the zeolite as found naturally or as synthetically prepared. The exchange treatment is such as to reduce the alkali metal content of the final catalyst to less than about 1.5 weight percent and preferably less than about 0.5 weight percent. The purpose of ion exchange is to substantially remove alkali metal cations which are known to be deleterious to cracking, as well as to introduce particularly desired catalytic activity by means of the various cations used in the exchange medium. For the cracking operation described herein, preferred cations are hydrogen, ammonium, rare earth and mixtures thereof, with particular preference being accorded rare earth. Ion exchange is suitably accomplished by conventional contact of the zeolite with a suitable salt solution of the desired cation such as, for example, the sulfate, chloride or nitrate.

It is preferred to have the crystalline zeolite of the cracking catalyst in a suitable matrix, since this catalyst form is generally characterized by a high resistance to attrition, high activity and exceptional steam stability. Such catalysts are readily prepared by dispersing the crystalline zeolite in a suitable siliceous sol and gelling the sol by various means. The inorganic oxide which serves as the matrix in which the above crystalline zeolite is distributed includes silica gel or a cogel of silica and a suitable metal oxide. Representative cogels include silica-alumina, silica-magnesia, silica-zirconia, silica-thoria, silica-beryllia, silica-titania, as well as ternary combinations such as silica-alumina-magnesia, silica-alumina-zirconia and silica-magnesia-zirconia. Preferred cogels include silica-alumina, silica-zirconia or silica-alumina-zirconia. The above gels and cogels will generally comprise a major proportion of silica and a minor proportion of the other aforementioned oxide or oxides. Thus, the silica content of the siliceous gel or cogel matrix will generally fall within the range of 55 to 100 weight percent, preferably 60 to 95 weight percent, and the other metal oxide or oxides content will generally be within the range of 0 to 45 weight percent and preferably 5 to 40 weight percent. In addition to the above, the matrix may also comprise natural or synthetic clays, such as kaolin type clays, montmorillonite, bentonite or halloysite. These clays may be used either alone or in combination with silica or any of the above specified cogels in matrix formulation.

Where a matrix is used, content of crystalline zeolite, i.e. the amount of the zeolite Y component, is generally between about 5 and about 50 weight percent. Ion exchange of the zeolite to replace its initial alkali metal content can be accomplished either prior to or subsequent to incorporation of the zeolite into the matrix.

The above compositions may be readily processed so as to provide fluid cracking catalysts by spray drying the composite to form microspheroidal particles of suitable size. Alternatively, the composition may be adjusted to suitable concentration and temperature to form bead type catalyst particles suitable for use in moving bed type cracking systems. The catalyst may also be used in various other forms such as those obtained by tabletting, balling or extruding.

CRACKING CHARGE STOCKS

Hydrocarbon charge stocks undergoing cracking in accordance with this invention comprise hydrocarbons generally and, in particular, petroleum fractions having an initial boiling point of at least 200° C., a 50% point range of at least 260° C. and an end point of at least 320° C. Such hydrocarbon fractions include gas oils, residual oils, cycle stocks, whole top crudes and heavy hydrocarbon fractions derived by the destructive hydrogenation of coal, tar, pitches, asphalts and the like. As will be recognized, the distillation of higher boiling petroleum fractions above about 400° C. must be carried out under vacuum in order to avoid thermal cracking. The boiling temperatures utilized herein are expressed in terms of convenience of the boiling point corrected to atmospheric pressure.

ALUMINUM EXTRACTION

Any conventional method of extracting aluminum from large pore zeolites can be used to extract framework aluminum from the intermediate pore size zeolites of the present invention, although not always with equivalent results.

We prefer to extract aluminum using either a strong mineral acid, a chelating agent, or other complexing agent or some combination of approaches.

The starting material is usually in the hydrogen form for best removal of aluminum from the zeolite framework. The hydrogen form may be generated in-situ, e.g., if an acid is used for the aluminum extraction, the H-form is made in-situ. Another way would be ion-exchange with $NH^+$, calcination in the pressure of water vapor or steam, causing removal of some Al from the framework, and finally ion-exchanging this, now cationic, Al with a salt, e.g., an $NH_4^+$ salt. The latter ion-exchange can be facilitated by using a chelating agent, e.g., $(NH_4)_2 H_2EDTA$, for the $NH_4^+$ exchange. The EDTA removes the $Al^{3+}$ ions from the ion-exchange equilibrium by complexing. $(NH_4)_2 H_2EDTA$ does not remove framework-Al, while $H_4 EDTA$ does.

When a strong acid is used to extract alumina, any mineral acid such as phosphoric, hydrochloric, nitric, or sulfuric may be used, as well as mixtures thereof. Use of relatively concentrated sulfuric or hydrochloric acids, e.g., 1 to 10 normal, gives good acid extraction by simply heating the zeolite in the acid solution. Temperatures of 50° to 300° C. may be used, with pressures sufficient to maintain a liquid phase. Preferably temperatures of 90° to 250° C. are used, with temperatures of 100° to 160° C. most preferred.

It is more difficult to remove aluminum from the zeolites of the present invention than from large pore zeolites, e.g., Y and mordenite. Somewhat more severe extracting conditions are needed. The best extracting agent cannot remove Al from the zeolite, if the pores are too small for the $Al^{3+}$ to pass through.

When we talk about aluminum sites, we usually mean tetrahedral or framework sites. These sites are not covered by water of hydration. But when this Al is hydrolyzed out of the framework, then the small $Al^{3+}$ cations, of high charge density, are surrounded by water of hydration.

It may be possible to use weaker acids, e.g., six normal acetic acid, or very dilute solutions of strong mineral acids, e.g., $0.1N H_2SO_4$, but when such an approach is taken higher temperatures or longer acid extraction times will be necessary.

The other general approach to aluminum removal is used of a chelating agent such as ethylenediaminetetraacetic acid, EDTA, nitrilo triacetic acid, NTA, or other chelating agents. The chelating agent, e.g., EDTA, does not go into the zeolite pores. It only removes the $Al^{3+}$, migrating out of the pores, from the ion-exchange equilibrium by complexing. Thus, the chelating agent does not actually remove the Al from the framework. This latter reaction is caused by the reaction of the $H^+$ form with water (hydrolysis).

The minimum amount of chelating agent that must be added is that required by stoichiometry to remove the desired amount of aluminum from the zeolite framework. The upper limit on amount of chelating agent that is added is set more by economics than anything else. It is possible to operate with a tremendous excess of chelating agent and shorten the amount of time, or temperature, required for aluminum extraction.

The preferred chelating agent is EDTA. We prefer to operate with 1 to 10 times the EDTA required by stoichiometry. The process can be conducted simply in a container with water, at temperatures of 50 to 250 C., with pressure sufficient to maintain a liquid phase.

It is also possible to combine both aluminum extraction techniques when desired. In one embodiment the shape selective zeolite will be subjected to aluminum extraction with a strong mineral acid, followed by aluminum extraction using a chelating agent. In another embodiment, extraction of aluminum will first be conducted using a chelating agent, followed by strong acid extraction. In yet another embodiment, some chelating agent may be added to the acid solution used to extract aluminum, or some strong mineral acid may be added to the solution containing chelating agent.

At least some aluminum removal is necessary. Significant improvement in activity occurs in some zeolites with a constraint index of 1 to 12, and a silica alumina ratio greater than 12, when only 5% of the zeolite alumina is removed. Preferably 10 to 90% is removed.

Preferably, there is limited removal of some of the alumina by an acid treatment process. The acid treatment with associated removal of alumina leads to enhanced catalytic activity after being subjected to an equivalent steam treatment.

CONVENTIONAL CATALYST FINISHING STEPS

The catalyst may be steamed prior to use, for instance, in a TCC unit. Steaming is usually not necessary when the catalyst is to be used in an FCC unit.

EXAMPLES

Example 1

Zeolite Starting Material

The basic zeolite starting material used for subsequent testing was prepared as follows:

A 250 g sample of small-size (0.02 to 0.03 micron) ZSM-5 ($SiO_2/Al_2O_3 \approx 40$) was sized to 8–10 mesh and calcined in a tube furnace in an ammonia stream to 600° C. and held at this temperature for one hour. The material was then cooled to room temperature in an ammonia stream. The product was exchanged three times with a solution being 0.1N in $NH_4Cl$ and 0.1N in $NH_4OH$, using 50 cc/g, at room temperature with occasional stirring for two hours each. The material was then filtered, washed chloride-free and dried at ambient temperature.

This material, after the above ion exchange treatment was subjected to conventional calcination, three hours at 538° C. It contained 4.5 wt % $Al_2O_3$ and had a n-hexane cracking activity of alpha=267. After steaming two hours at 593° C. with 100% atmospheric steam, alpha was 25.

Alpha Test Discussion

An examination of the dispersion in alpha values was conducted to assess the precision of the alpha test. A series of tests was conducted over a several month period with catalyst having alpha activities around 50, 100, and 200.

Based upon about 100 tests, the relative standard deviation was on the order of 15 percent, based on an average of all tests.

Example 2

EDTA Extraction

The benefits of the proposed acid treatment are described in Example 2. Here the ammonium form of Example 1 was treated with EDTA, reducing the $Al_2O_3$ content from 4.5 wt % to 3 wt % with unexpected increase in alpha activity both after calcining and after steaming.

The ammonium form of ZSM-5 prepared in example 1, 10 g, was reslurried with 200 g of water. Ethylenediaminetetraacetic acid, 2.5 g, was added. The mixture was sealed in a teflon jar and heated in a pressurized steam box at 150° C. for 24 hours. The product was filtered, washed with hot water and dried at ambient temperature. It contained 3.0 wt % $Al_2O_3$ and had a n-hexane cracking activity of alpha=600 after calcining at 538° C. for three hours. After steaming for two hours at 593° C. with 100% steam at atmospheric pressure, alpha was 56.

Example 3

$H_2SO_4$ Extraction

In like manner a similar base material as Example 1 was treated with concentrated $H_2SO_4$ diluted with 100 g $H_2O$. Here again the acid treatment reduced the $Al_2O_3$ content from 4.5 to 3.0 and increased the alpha activity both after calcining and after steaming.

A duplicate preparation of example 1, 10 g, was slurried with 100 g of water. Concentrated sulfuric acid, 5.0 g, was added with stirring. The reaction mixture was sealed in a teflon jar and heated at 150° C. for 24 hours. The product was filtered, washed until free of sulfate, and dried at ambient temperature. It contained 3.0 wt % $Al_2O_3$ and had a n-hexane cracking activity of alpha=561 after calcining at 538° C. for three hours. After steaming for two hours at 593° C., alpha was 58.

Example 4

EDTA Extraction

This shows the catalytic improvement resulting from an EDTA treatment which reduced the $Al_2O_3$ to 3.5 wt % while increasing the alpha activity.

A duplicate preparation of example 1 was treated with 2.5 g. EDTA and 200 g of water for 24 hours at 100° C. The washed and dried product contained 3.5 wt % $Al_2O_3$ and had a n-hexane cracking activity of alpha=769.

Example 5

$H_2SO_4$ Extraction

Another small size starting material was treated with $H_2SO_4$ as source of acid to produce a zeolite with a 3.4 wt % $Al_2O_3$.

A 250 g sample of small-size (about 0.02 to 0.03 microns or perhaps slightly smaller) ZSM-5 ($SiO_2/Al_2O_3 \approx 40$) was sized, calcined and cooled in an ammonia stream as described in example 1, but not ion-exchanged. Excess ammonia was removed by flushing with nitrogen at room temperature.

A 140 g sample of this material was slurried with 1400 g of water. Concentrated sulfuric acid, 70 g, was added with stirring. The mixture was heated in a teflon jar at 150° C. for 24 hours. The product was separated by filtration, washed sulfate-free and dried at room temperature. It contained 3.4 wt % $Al_2O_3$ and had a n-hexane cracking activity of alpha=764. After steaming for two hours at 593° C., alpha was 41.

Examples 6 and 7 show the catalytic advantages for an acid EDTA treatment on a large size (1 micron) ZSM-5 with $SiO_2/Al_2O_3$ ratios of about 70/1. Here the acid treatment as shown by Example 7 showed that a slight reduction in alumina from 2.3 wt % (Ex. 6) to 2.2 wt % (Ex. 7) had a significant effect on activity increasing the calcined alpha from 324 to 458 and steamed alpha from 58 to 102. These dramatic changes suggest that not only some alumina is removed but that some of the alumina could be redistributed and contribute to the enhanced activity in the larger size ZSM-5.

Example 6

Zeolite Starting Material

A sample of large-size ZSM-5 (about 1.0 microns) ($SiO_2/Al_2O_3 \approx 70$) was calcined and ion-exchanged in the same manner as described in example 1. The ammonium form prepared contained 2.3 wt % $Al_2O_3$. After calcining three hours at 538° C., it had a n-hexane cracking activity of alpha=324. After steaming for two hours at 593° C., alpha was 58. The next example, the product of example 6 is acid-treated.

Example 7
EDTA Extraction

The ammonium form prepared in example 6, 10 g, was slurried with 100 g of water. Ethylenediaminetetraacetic acid, 1.25 g, was added, and the mixture was heated in a sealed teflon jar at 150° C. for 24 hours. The product was filtered and washed with hot water. The product contained 2.2 wt % $Al_2O_3$. After calcining for three hours at 538° C., the n-hexane cracking activity was alpha=458. After steaming for two hours at 593° C., alpha was 102.

Example 8
EDTA Extraction

This example illustrates the effect of an acid treatment on a higher $SiO_2/Al_2O_3$ 70/1 starting material. Here the changes in alpha activity both calcined and steamed after the EDTA treatment were not as pronounced as with the 40/1 $SiO_2/Al_2O_3$ used in Examples 1-5.

The ammonium form of small-size ZSM-5 of $SiO_2/Al_2O_3=70$ was treated with EDTA at 300° F.:

|  | $NH_4$ ZSM-5 $SiO_2/Al_2O_3 = 70$ | $NH_4$ ZSM-5 EDTA treated |
|---|---|---|
| $Al_2O_3$, wt % | 2.6 | 2.1 |
| Alpha, Calcined | 380 | 391 |
| Alpha, steamed 2 hrs @ 593° C. | 22 | 26 |

The following examples demonstrate the effect of acid treatment on ZSM-12.

Examples 9 and 10 show that the activity of a ZSM-12 zeolite can also be enhanced by aluminum extraction.

Example 9
Zeolite Starting Material

A sample of ZSM-12 (about 1μ size crystals), crystallized in the presence of methyltriethylammonium ions and having a $SiO_2/Al_2O_3$ of ≈120 was sized 14-25 mesh, calcined and ammonium ion-exchanged in the same manner as described in Example 1. After washing and drying at ambient temperature, the product contained 1.3% alumina, based on ignited weight, and 0.01% residual sodium. The n-hexane cracking activity of the material calcined for 3 hours at 538° C. in air was 82. After steaming for two hours at 593° C. with 100% steam of atmospheric pressure, alpha was 33.

Example 10
$H_2SO_4$ Extraction

The same starting material as in Example 9 was calcined in a nitrogen stream for 2 hours at 600° C. After this time the nitrogen was replaced by air, and the calcination was continued for two more hours.

Fifty grams of the calcined material was slurried with 300 g of water. Then 15 g of conc. sulfuric acid was added. The slurry was sealed in a Teflon bottle and heated in a pressure steam box at 300° F. (149° C.) for 24 hours. The solid was then washed with hot water until free of sulfate and dried at ambient temperature. The alumina content was reduced to 1.15%, based on ignited weight, corresponding to a $SiO_2/Al_2O_3$ of 142. The material, calcined at 538° C. for three hours, had an alpha-activity of 144. After steaming for 2 hours at 593° C., the alpha was 42.

The significance of these examples is that the cracking activity, or acid activity of the catalyst as measured by the alpha number, increases although aluminum has been removed from the zeolite.

When starting with a relatively low silica/alumina ZSM-5, the ZSM-5 used in Examples 1-5, with a 40:1 silica to alumina mole ratio, the acid extraction techniques of the present invention improve the alpha activity both before and after steaming as compared to no aluminum removal.

These experimental results are not unique to ZSM-5, other shape selective catalysts, such as those in examples 8-10, showed similar results.

Extraction of aluminum from ZSM-12 whether by strong acid, or use of chelating agent, significantly increased the alpha activity of the catalyst after conventional steaming treatment.

What is claimed is:

1. A process for catalytically cracking n-hexane in a chargestock containing n-hexane, comprising contacting said chargestock with a zeolite selected from the group consisting of ZSM-5 and ZSM-12 in the acid form, said zeolite having framework aluminum whereby the zeolite framework silica:alumina mole ratio is greater than about 12, wherein said zeolite has been treated to increase its acid activity by a treatment consisting of subjecting the zeolite with a silica:alumina ratio of greater than 12 to an extraction agent selected from the group consisting of sulfuric acid and ethylenediaminetetraacetic acid at a temperature of 50° to 300° C. at a pressure sufficient to maintain a liquid phase to increase the acid activity of said zeolite, wherein at least about 5% of said framework aluminum is extracted; and recovering products of n-hexane cracking.

2. The process of claim 1 wherein said extraction temperature is 90° to 180° C.

3. The process of claim 1 wherein said zeolite, prior to contact with said aluminum extracting reagent, is in the hydrogen or $NH_4$ form.

4. The process of claim 1 wherein said cracking process is fluidized catalytic cracking.

5. A process for converting a feedstock comprising hydrocarbon compounds to conversion product comprising hydrocarbon compounds of lower molecular weight than feedstock hydrocarbon compounds which comprises contacting said feedstock at conditions sufficient to convert said feedstock to said product with a catalyst composition comprising a zeolite selected from the group consisting of ZSM-5 and ZSM-12 in the acid form, said zeolite having framework aluminum whereby the zeolite framework silica:alumina mole ratio is greater than about 12, wherein said zeolite has been treated to increase its acid activity by a treatment consisting of subjecting the zeolite with a silica:alumina ratio of greater than 12 to an aluminum extraction reagent selected from the group consisting of sulfuric acid and ethylenediaminetetraacetic acid at a temperature of 50° to 300° C. at a pressure sufficient to maintain a liquid phase to increase the acid activity of said zeolite, wherein at least about 5% of said framework aluminum is extracted; and producing said conversion product.

6. The process of claim 5 wherein said temperature is 90° to 180° C.

7. The process of claim 5 wherein said zeolite, prior to contact with said aluminum extraction reagent, is in the hydrogen or $NH_4$ form.

8. The process of claim 5 wherein said conversion process is catalytic cracking.

9. The process of claim 8, wherein said zeolite is ZSM-5.

10. The process of claim 5 wherein said conversion process is fluidized catalytic cracking.

11. The process of claim 5, wherein said zeolite is ZSM-5.

* * * * *